United States Patent
Peters

(10) Patent No.: US 10,355,403 B2
(45) Date of Patent: Jul. 16, 2019

(54) TOOL COUPLER FOR USE WITH A TOP DRIVE

(71) Applicant: Weatherford Technology Holdings, LLC, Houston, TX (US)

(72) Inventor: Shern E. Peters, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/656,508

(22) Filed: Jul. 21, 2017

(65) Prior Publication Data

US 2019/0027860 A1 Jan. 24, 2019

(51) Int. Cl.
| | |
|---|---|
| H01R 13/625 | (2006.01) |
| E21B 3/02 | (2006.01) |
| E21B 41/00 | (2006.01) |
| F16D 1/06 | (2006.01) |
| F16D 1/108 | (2006.01) |
| H01R 13/52 | (2006.01) |
| H01R 43/26 | (2006.01) |
| E21B 17/046 | (2006.01) |
| E21B 19/16 | (2006.01) |

(52) U.S. Cl.
CPC ............. *H01R 13/625* (2013.01); *E21B 3/02* (2013.01); *E21B 17/046* (2013.01); *E21B 19/16* (2013.01); *E21B 41/00* (2013.01); *F16D 1/06* (2013.01); *F16D 1/108* (2013.01); *H01R 13/5219* (2013.01); *H01R 43/26* (2013.01)

(58) Field of Classification Search
CPC .. H01R 13/625; H01R 13/5219; H01R 43/26; E21B 3/02; E21B 41/00; F16D 1/06; F16D 1/108

USPC .......................................... 439/334–335, 190
See application file for complete search history.

(56) References Cited

U.S. PATENT DOCUMENTS

| | | |
|---|---|---|
| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,776,320 A | 12/1973 | Brown |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

A123 System; 14Ah Prismatic Pouch Cell; Nanophosphate® Lithium-Ion; www.a123systems.com; date unknown; 1 page.

(Continued)

*Primary Examiner* — Khiem M Nguyen
(74) *Attorney, Agent, or Firm* — Patterson + Sheridan, LLP

(57) ABSTRACT

A tool coupler includes a first component having a shaft and a plurality of locking members; a second component having an inner housing for receiving the shaft and a plurality of complementary locking member; and an outer housing configured to rotationally lock the first component to the second component.

22 Claims, 10 Drawing Sheets

(56) References Cited

U.S. PATENT DOCUMENTS

| | | |
|---|---|---|
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |

(56) References Cited

U.S. PATENT DOCUMENTS

| | | |
|---|---|---|
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0163822 A1 | 8/2004 | Zhang et al. |
| 2004/0216924 A1 | 11/2004 | Pietras et al. |
| 2004/0222901 A1 | 11/2004 | Dodge et al. |
| 2005/0000691 A1 | 1/2005 | Giroux et al. |
| 2005/0087368 A1 | 4/2005 | Boyle et al. |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0001549 A1 | 1/2006 | Shah et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2006/0290528 A1 | 12/2006 | MacPherson et al. |
| 2007/0017671 A1 | 1/2007 | Clark et al. |
| 2007/0029112 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0137853 A1 | 6/2007 | Zhang et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0188344 A1 | 8/2007 | Hache et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2007/0263488 A1 | 11/2007 | Clark |
| 2008/0006401 A1 | 1/2008 | Buytaert et al. |
| 2008/0007421 A1 | 1/2008 | Liu et al. |
| 2008/0059073 A1 | 3/2008 | Giroux et al. |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0115623 A1 | 5/2009 | Macpherson et al. |
| 2009/0146836 A1 | 6/2009 | Santoso et al. |
| 2009/0151934 A1 | 6/2009 | Heidecke et al. |
| 2009/0159294 A1 | 6/2009 | Abdollahi et al. |
| 2009/0173493 A1 | 7/2009 | Hutin et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0289808 A1 | 11/2009 | Prammer |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0097890 A1 | 4/2010 | Sullivan et al. |
| 2010/0101805 A1 | 4/2010 | Angelle et al. |
| 2010/0116550 A1 | 5/2010 | Hutin et al. |
| 2010/0171638 A1 | 7/2010 | Clark |
| 2010/0171639 A1 | 7/2010 | Clark |
| 2010/0172210 A1 | 7/2010 | Clark |
| 2010/0182161 A1 | 7/2010 | Robbins et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0213942 A1 | 8/2010 | Lazarev |
| 2010/0236777 A1 | 9/2010 | Partouche et al. |
| 2010/0271233 A1 | 10/2010 | Li et al. |
| 2010/0328096 A1 | 12/2010 | Hache |
| 2011/0017512 A1 | 1/2011 | Codazzi |
| 2011/0018734 A1 | 1/2011 | Varveropoulos et al. |
| 2011/0036586 A1 | 2/2011 | Hart et al. |
| 2011/0039086 A1 | 2/2011 | Graham et al. |
| 2011/0198076 A1 | 8/2011 | Villreal et al. |
| 2011/0214919 A1 | 9/2011 | McClung, III |
| 2011/0280104 A1 | 11/2011 | McClung, III |
| 2012/0013481 A1 | 1/2012 | Clark |
| 2012/0014219 A1 | 1/2012 | Clark |
| 2012/0048574 A1 | 3/2012 | Wiens et al. |
| 2012/0126992 A1 | 5/2012 | Rodney et al. |
| 2012/0152530 A1 | 6/2012 | Wiedecke et al. |
| 2012/0160517 A1 | 6/2012 | Bouligny et al. |
| 2012/0166089 A1 | 6/2012 | Ramshaw et al. |
| 2012/0212326 A1 | 8/2012 | Christiansen et al. |
| 2012/0234107 A1 | 9/2012 | Pindiprolu et al. |
| 2012/0274477 A1 | 11/2012 | Prammer |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0192357 A1 | 8/2013 | Ramshaw et al. |
| 2013/0207382 A1 | 8/2013 | Robichaux |

(56) References Cited

U.S. PATENT DOCUMENTS

| | | |
|---|---|---|
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0278432 A1 | 10/2013 | Shashoua et al. |
| 2013/0299247 A1 | 11/2013 | Küttel et al. |
| 2014/0083768 A1 | 3/2014 | Moriarty et al. |
| 2014/0083769 A1 | 3/2014 | Moriarty et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustaysson et al. |
| 2014/0246237 A1 | 9/2014 | Prammer |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0075770 A1 | 3/2015 | Fripp et al. |
| 2015/0083391 A1 | 3/2015 | Bangert et al. |
| 2015/0090444 A1 | 4/2015 | Partouche et al. |
| 2015/0107385 A1 | 4/2015 | Mullins et al. |
| 2015/0131410 A1 | 5/2015 | Clark |
| 2015/0275657 A1 | 10/2015 | Deffenbaugh et al. |
| 2015/0285066 A1 | 10/2015 | Keller et al. |
| 2015/0292319 A1 | 10/2015 | Disko et al. |
| 2015/0337648 A1 | 11/2015 | Zippel et al. |
| 2015/0337651 A1 | 11/2015 | Prammer |
| 2016/0024862 A1 | 1/2016 | Wilson et al. |
| 2016/0032715 A1 | 2/2016 | Mueller et al. |
| 2016/0053610 A1 | 2/2016 | Switzer et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2016/0291188 A1 | 10/2016 | Lim |
| 2016/0326867 A1 | 11/2016 | Prammer |
| 2016/0333682 A1 | 11/2016 | Griffing et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211343 A1 | 7/2017 | Thiemann |
| 2017/0248009 A1 | 8/2017 | Fripp et al. |
| 2017/0248012 A1 | 8/2017 | Donderici et al. |
| 2017/0284164 A1 | 10/2017 | Holmes et al. |
| 2017/0335681 A1 | 11/2017 | Nguyen et al. |
| 2017/0356288 A1 | 12/2017 | Switzer et al. |
| 2018/0087374 A1 | 3/2018 | Robson et al. |
| 2018/0087375 A1 | 3/2018 | Segura Dominguez |
| 2018/0135409 A1 | 5/2018 | Wilson et al. |
| 2018/0252095 A1 | 9/2018 | Pridat et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2016197255 A1 | 12/2016 |
| WO | 2017/044384 A1 | 3/2017 |

OTHER PUBLICATIONS

Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 Mb for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.

(56) References Cited

OTHER PUBLICATIONS

PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.

TOOL COUPLER FOR USE WITH A TOP DRIVE

BACKGROUND

Embodiments of the present disclosure generally relate to equipment and methods for coupling one or more tools to a top drive. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with, threaded connections. Such threaded connections are capable of transferring load. Right-hand (RH) threaded connections are also capable, of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

There is, therefore, a need for a coupler to capable of addressing at least one of the problems described above.

SUMMARY OF THE DISCLOSURE

The present disclosure generally relates to equipment and methods for coupling a top drive to one or more tools. The coupling may transfer both axial load and torque bi-directionally from the top drive to the one or more tools.

In an embodiment, a tool coupler includes a first component having a shaft and a plurality of locking members; a second component having an inner housing for receiving the shaft and a plurality of complementary locking member; and an outer housing configured to rotationally lock the first component to the second component.

In an embodiment, a method of coupling a first component to a second component includes inserting a central shaft of the first component into an inner housing of the second component; rotating the first component relative to the second component to cause a plurality of locking members of the first component to engage a plurality of complementary locking members of the second component; and axially moving an outer housing of the second component relative to the inner housing to rotationally lock the first component relative to the second component.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides equipment and methods for coupling a top drive to one or more tools. In one embodiment, a tool coupler is used to couple a tool to the top drive. The tool coupler may transfer torque bi-directionally from the top drive to the one or more tools. The tool coupler may provide mechanical, electrical, optical, hydraulic, and/or pneumatic connections. The tool coupler may convey torque, load, data, signals, and/or power tool coupler Some of the many benefits provided by embodiments of this disclosure include a tool coupler having a simple mechanism that is low maintenance. Benefits also include a reliable method to transfer full bi-directional torque, thereby reducing the risk of accidental breakout of threaded connections along the tool string. Embodiments may also provide automatic connection for power and data communications.

Figure 1:
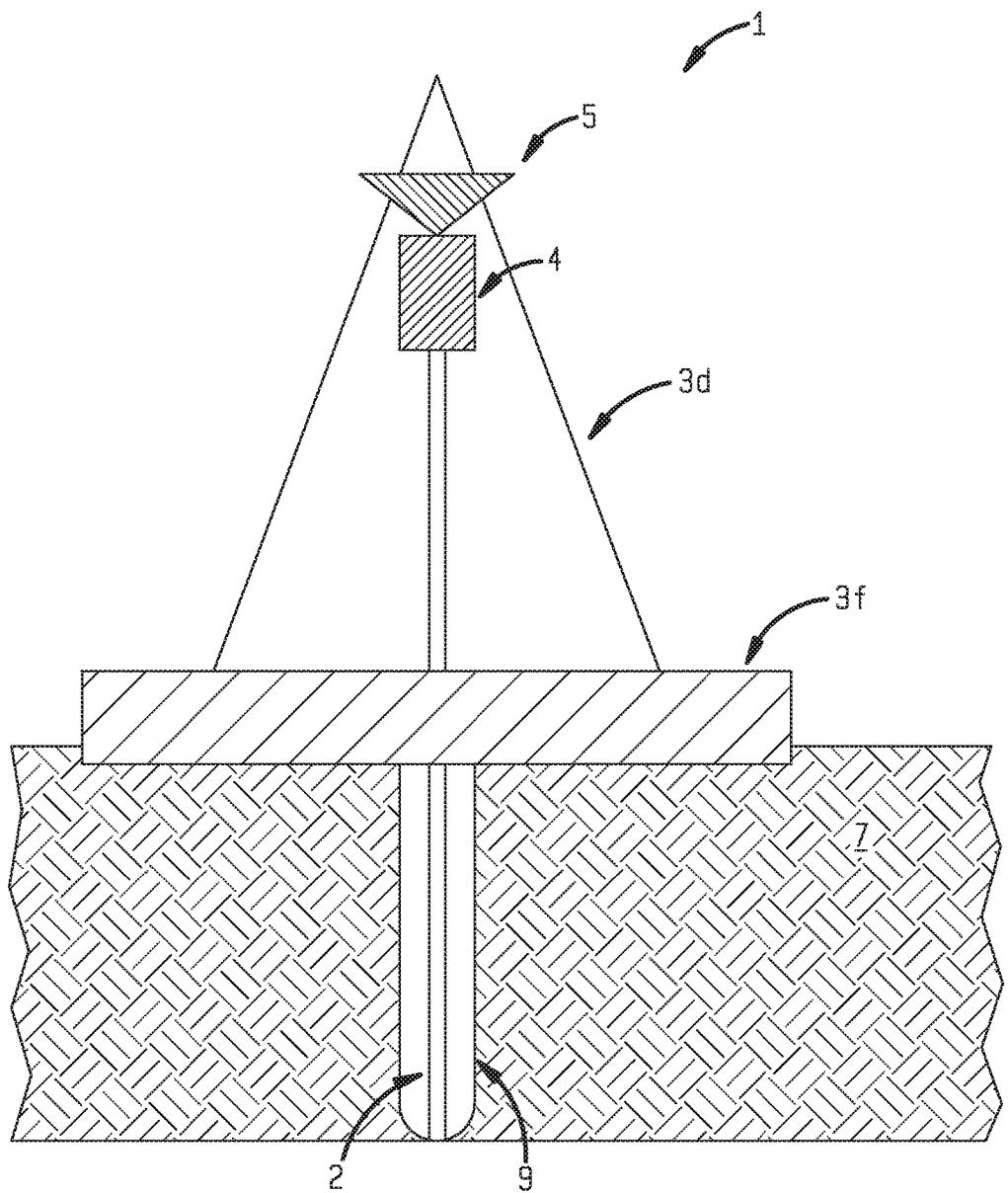
FIG. 1 illustrates a drilling system, according to embodiments of the present disclosure.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be used to handle a tool string 2. At various times, the top drive 4 may support the axial load of the tool string 2. The rig floor 3f may have an opening through which the tool string 2 extends downwardly into a wellbore 9. At various times, the rig floor 3f may support the axial load of tool string 2. The top drive 4 may include a drive unit to provide torque to the tool string 2, for example to operate a drilling bit near the bottom of the wellbore 9. The tool string 2 may include joints of drill pipe connected together, such as by threaded couplings.

At various times, the top drive 4 may provide right hand (RH) or left hand (LH) torque to tool string 2, for example to make up or break out joints of drill pipe. Power and/or signals may be communicated between the top drive 4 and the tool string 2. For example, pneumatic, hydraulic, electrical, optical, or other power and/or signals may be communicated between top drive 4 and tool string 2.

Figure 2:
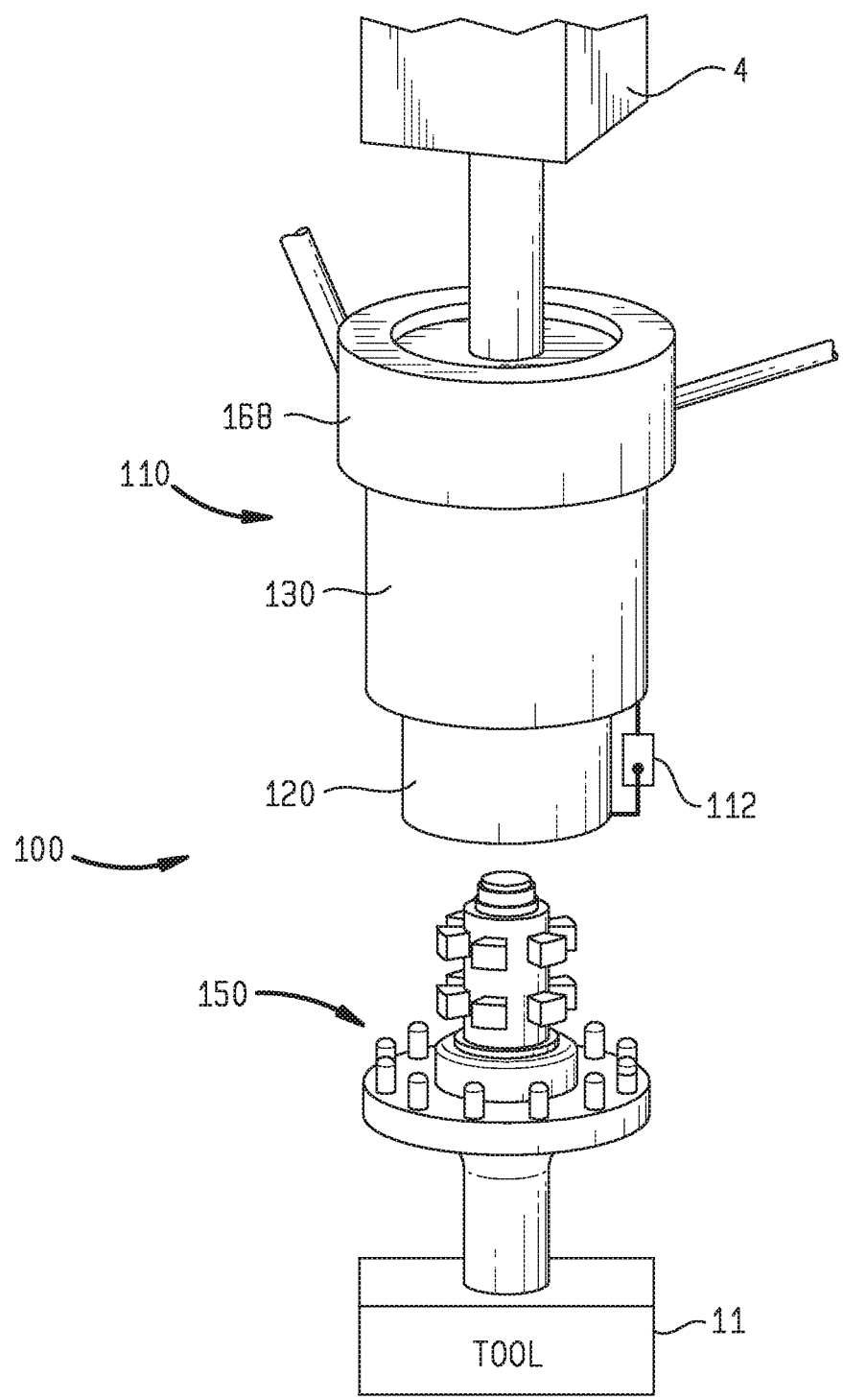
FIG. 2 illustrates an exemplary tool coupler for a top drive system according to embodiments described herein.

FIG. 2 illustrates a tool coupler 100 for use with a top drive system (e.g., top drive 4 in FIG. 1) according to one embodiment. The tool coupler 100 is used to facilitate the connection of a tool 11 to the top drive 4. In some embodiments, the tool coupler is a multi-coupler for supporting load, transferring torque, and having couplings to transfer power, including hydraulic, electric, data, and/or pneumatic. In one embodiment, the tool coupler 100 includes a receiver assembly 110 and a tool adapter 150. The receiver assembly 110 is coupled to the top drive 4, and the tool adapter 150 is coupled to the tool. The tool adapter 150 is engageable with the receiver assembly 110 to connect the tool to the top drive 4.

Figure 3:
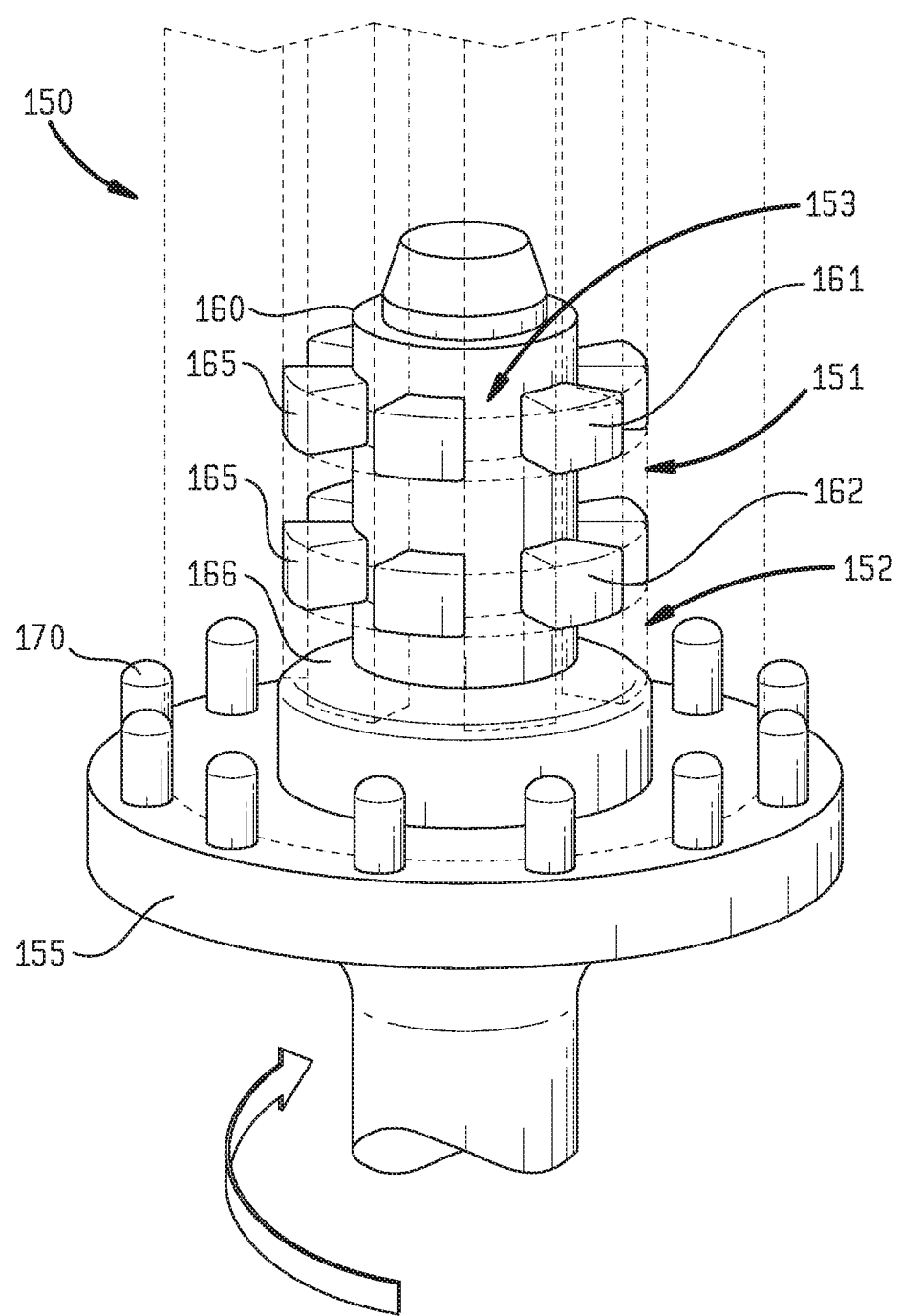
FIG. 3 illustrates an exemplary tool adapter of the tool coupler of FIG. 2.

FIG. 3 illustrates an exemplary embodiment of a tool adapter 150. The tool adapter 150 includes a base 155, a central shaft 160 extending from the base 155, and a plurality of locking members 165 disposed on the shaft 160. The bottom of the base 155 may be connected to the tool via a threaded connection or may be integrated with the tool. A shaft stand 166 is optionally provided on the bottom of the shaft 160.

In one embodiment, the plurality of locking members 165 is disposed circumferentially around the shaft 160. FIG. 3 shows two rows 161, 162 of locking members 165 disposed around the shaft 160. In this embodiment, the locking, members 165 on the top row 161 are aligned axially with the locking members 165 on the bottom row 162. An axial groove 153 is formed between adjacent locking members 165 on each row 161, 162. A first circumferential groove 151 is formed between the first row 161 and the second row 162, and a second circumferential groove 152 is formed between the second row 162 and the shaft stand 166. While six locking members 165 are shown in each row 161 162, it is contemplated that two, three, four, five, seven, eight, or more locking members 165 may be used. In one embodiment, each row 161, 162 may have between two and twelve locking members, between two and eight locking members, or between four and six locking members. In one embodiment, the tool adapter 150 may have between one and four rows of locking members 165, between one and three rows of locking members, or between one and two rows of locking members. In this embodiment, the locking members 165 are locking keys protruding radially from the shaft. In one embodiment, the locking members 165 are square shaped keys. It is contemplated that the locking members 165 may be configured with any suitable shape, such as rectangles and trapezoids.

The base 155 has a larger diameter than the shaft stand 166 and/or the outer perimeter of the locking members 165. One or more couplings 170 are disposed near the perimeter of the base 155. The couplings 170 are configured to transfer data and/or power, including hydraulic, electric, pneumatic, and combinations thereof. In one example, the coupling 170 is a tube extending upward from the base 155, and the bore in the tube is configured to communicate power and/or data. The coupling 170 is insertable into a channel in the receiver assembly 110.

Referring back to FIG. 2, the receiver assembly 110 generally includes an inner housing 120, an outer housing 130, an actuator 112 for moving the outer housing 130 axially relative to the inner housing 120. An optional swivel connector 168 is provided to transfer hydraulics, pneumatics, and/or electronics from the top drive 4 to the tool and from the tool to the top drive 4.

Figure 4:
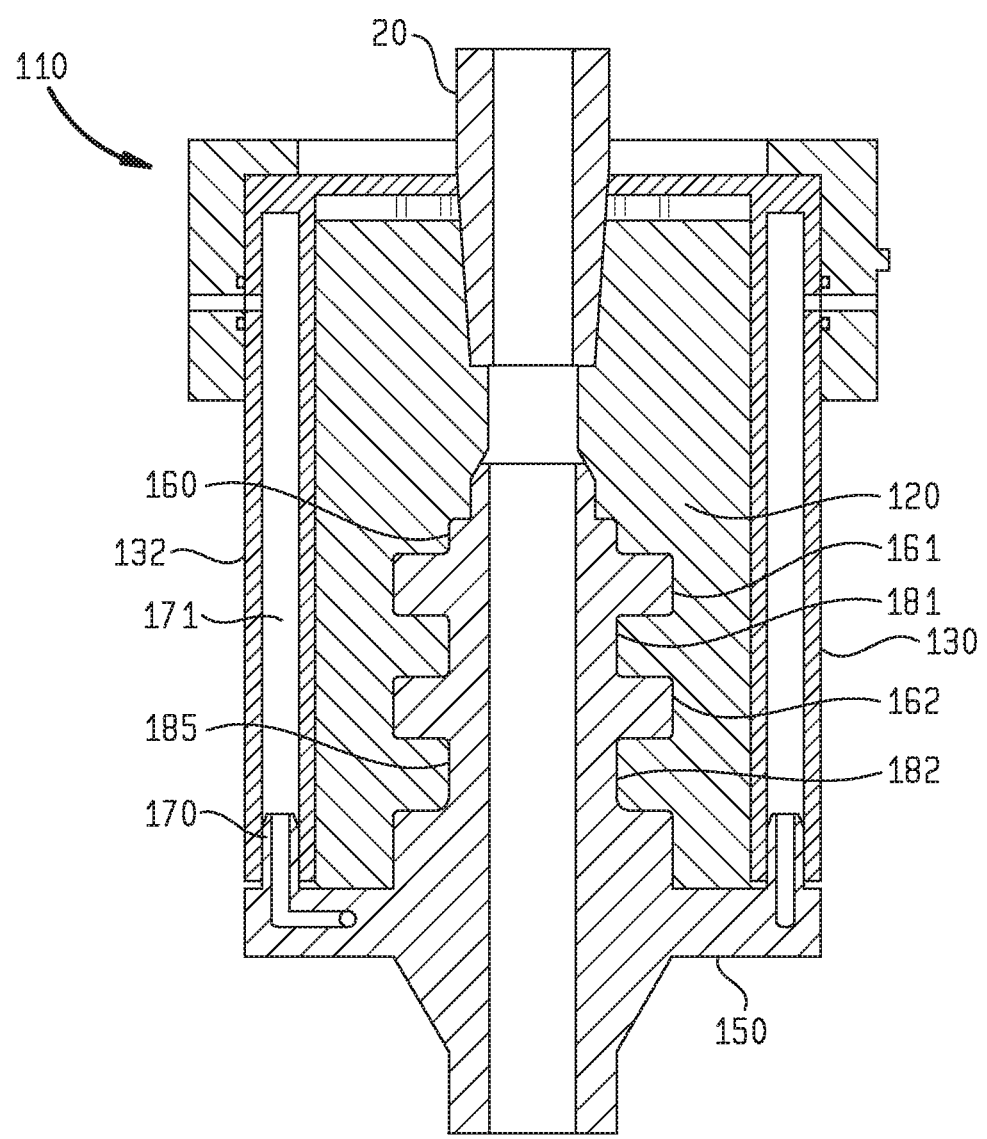
FIG. 4 is a cross-sectional view of an exemplary tool receiver of the tool coupler of FIG. 2.
Figure 5:
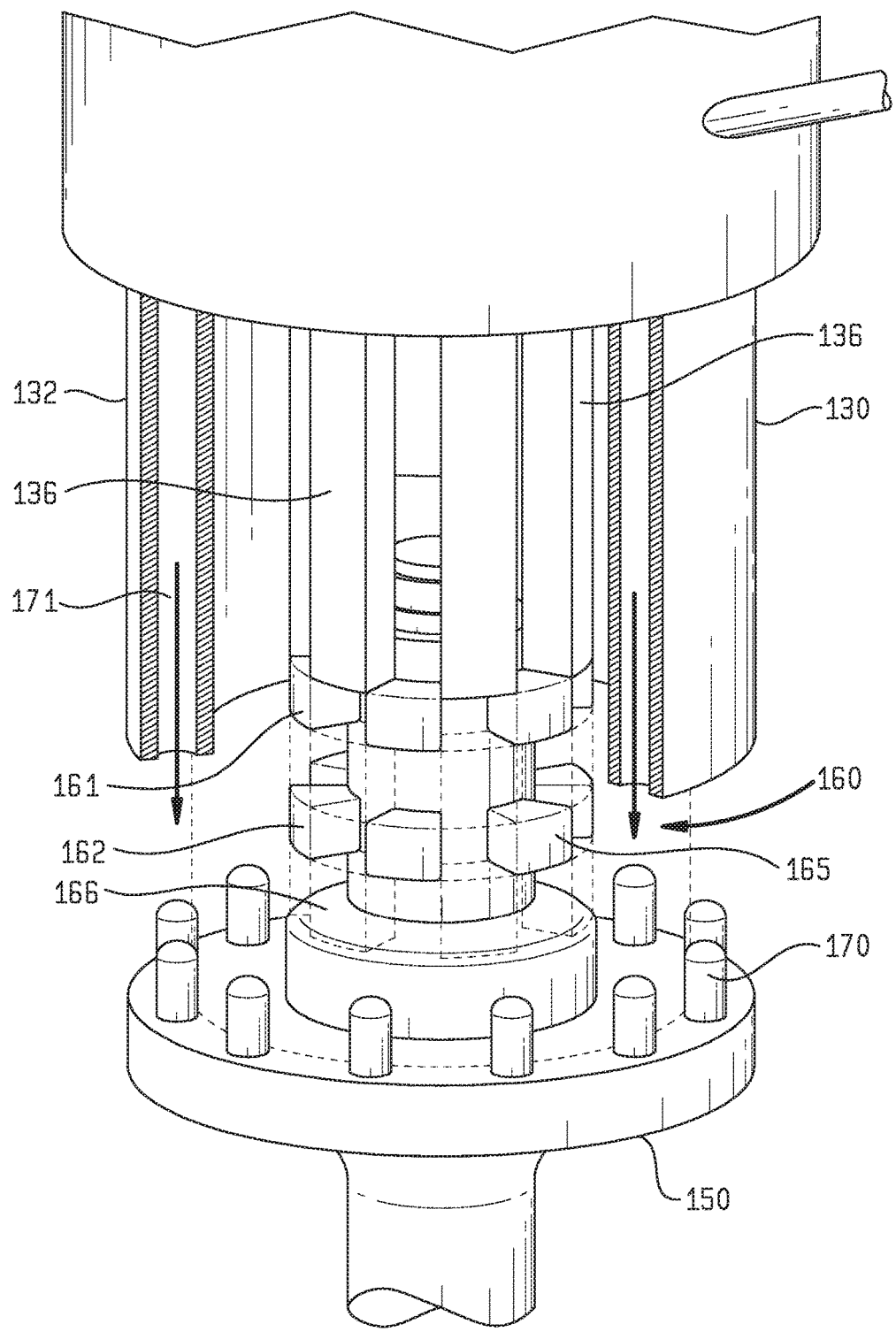
FIG. 5 illustrates the tool coupler of FIG. 2 without showing the inner housing.
Figure 6:
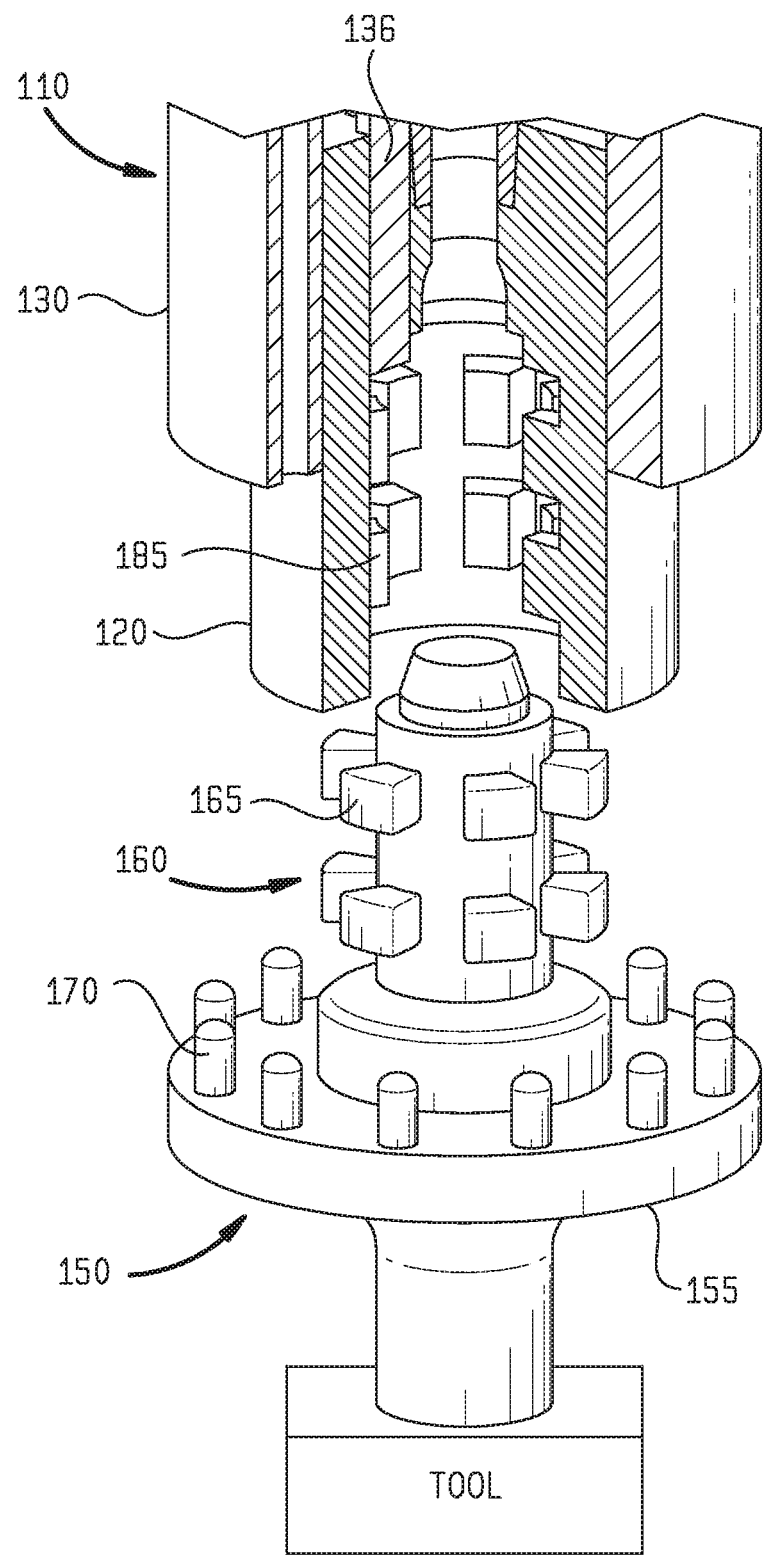
FIG. 6 illustrates one step of a multi-stop process for coupling the receiver assembly to the tool adapter of the tool coupler.

FIG. 4 illustrates a cross-sectional view of the tool coupler 100. As shown, the tool adapter 150 has engaged with the receiver assembly 110. The inner housing 120 is tubular shaped and is integrated with or attached to a shaft 20 extending from the top drive 4. The inner housing 120 has an opening for receiving the shaft 160 of the tool adapter 150. FIG. 6 shows a partial view of the opening of the inner housing 120. A plurality of complementary locking members 185 are circumferentially disposed in the opening for mating with the locking members 165 of the tool adapter 150. FIGS. 4 and 5 show two rows 181, 182 of complementary locking members 185. In this embodiment, the complementary locking members 185 on the top row 181 are aligned axially with the complementary locking members 185 on the bottom row 182. An axial groove 183 is formed between adjacent complementary locking members 185 on each row 181, 182. The complementary locking members 185 are sized to move axially in the axial groove 153 between the locking members 165 of the shaft 160. The top row 181 of complementary locking members 185 is sized to fit in the first circumferential groove 151 formed between the first row 161 of locking members 165 and the second row 162 of locking members 165. Similarly, the bottom row 182 of complementary locking members 185 is sized to fit in the second circumferential groove 152 formed between the second row 162 of locking members 165 and the shaft stand 166. In this embodiment, six complementary locking members 185 are shown in each row 181 182 to complement the locking members 165 of the shaft 160. It is contemplated the inner housing 120 may have any suitable number of complementary locking members 185, such as two, three, four, five, seven, eight, or more complementary locking members 185, to mate with the locking members 165 of the shaft 160. In this embodiment, the locking members 165 are square shaped keys. It is contemplated that the locking members 165 may be configured with any suitable shape, such as rectangles and trapezoids. In one example, the locking members 165 include an angled top surface, an angled bottom surface, or both. The complementary locking members 185 include an complementary angled top and/or bottom surface for engaging the respective angled top and/or bottom surface of the locking members 165. The complementary angled surfaces may act as a stop against relative rotation between the shaft 160 and the inner housing 120.

The outer housing 130 is disposed around the exterior of the inner housing 120. The outer housing 130 is axially movable relative to the inner housing 120. The outer wall 132 of the outer housing includes one or more channels for receiving a coupling 170 of the shaft 160. The channels provide communication between the coupling 170 and the swivel connector 168.

The outer housing 130 includes a plurality of inner beams 136 for engaging the locking members 165 of the shaft 160. FIG. 5 shows the outer housing 130 with the inner housing 120 removed for clarity. The beams 136 are circumferentially spaced and configured to fit in the axial groove 161 between the locking members 165 and in the groove between the complementary locking members 185. The beams 136 are radially spaced from the outer wall 132 such that the inner housing 120 is disposed in an annular area therebetween. As shown FIG. 7, the beams 136 are inserted through a portion of the inner housing 120.

In operation, the tool coupler 100 is used to connect a tool to a top drive 4. Exemplary tools include tubular gripping tools configured to grip an inner surface or an outer surface of the tubular, fill up tool, compensation tool, cementing tool, and elevators. The tool adapter 150 is integrated with or connected to the tool. The tool receiver 110 is coupled to or integrated with the shaft of the top drive 4. Referring to FIG. 6, the tool receiver 110 is ready to receive the shaft 160 of the tool adapter 150. The outer housing 130 is in an upward position relative to the inner housing, and the beams 136 are located above the first row of the complementary locking members 185.

Figure 7:
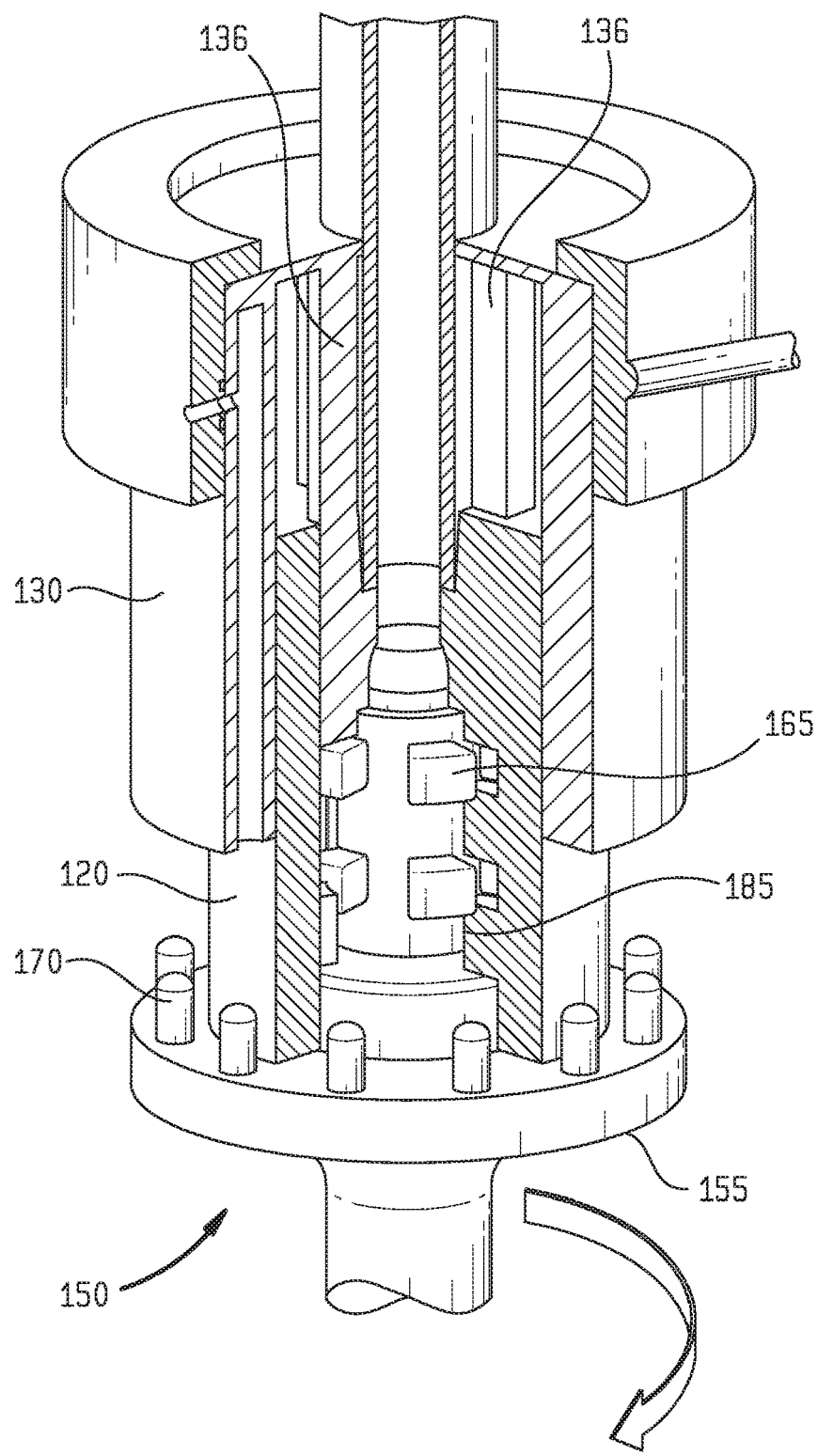
FIG. 7 illustrates another step of a multi-stop process for coupling the receiver assembly to the tool adapter of the tool coupler.

Before inserting the tool adapter 150, the axial grooves 153 of the shaft 160 are axially aligned with the complementary locking members 185 of the inner housing 120. The shaft 160 is inserted into the opening of the inner housing 120 until the base of the shaft 160 contacts the bottom of the inner, housing 120. In this position, as shown in FIG. 7, the top row 181 of complementary locking members 185 is aligned with the first circumferential groove 151 formed between the first row 161 of locking members 165 and the second row 162 of locking members 165. Also, the bottom row 182 of complementary locking members 185 is aligned with the second circumferential groove 152 formed between the second row 162 of locking members 165 and the shaft stand 166.

The tool adapter 150 is rotated until the axial grooves 153 of the shaft 160 are aligned with the axial grooves between the complementary locking members 185. In one example, the tool adapter 150 is rotated about 30 degrees. In another example, the locking members 165, 185 have angled surfaces that act as wedges to stop rotation of the shaft 160 relative to the inner housing 120. In this position, the top row 181 of complementary locking members 185 is located between the first row 161 of locking members 165 and the second row 162 of locking members 165, as shown in FIG. 4. Also, the bottom row 182 of complementary locking members 185 is located between the second row 162 of locking members 165 and the shaft stand 166. As a result, the shaft 160 locked from relative axial movement with respect to the tool receiver 110. In this respect, axial load from the tool and components attached thereto is supported by the tool receiver 130 and the top drive 4.

Figure 8:
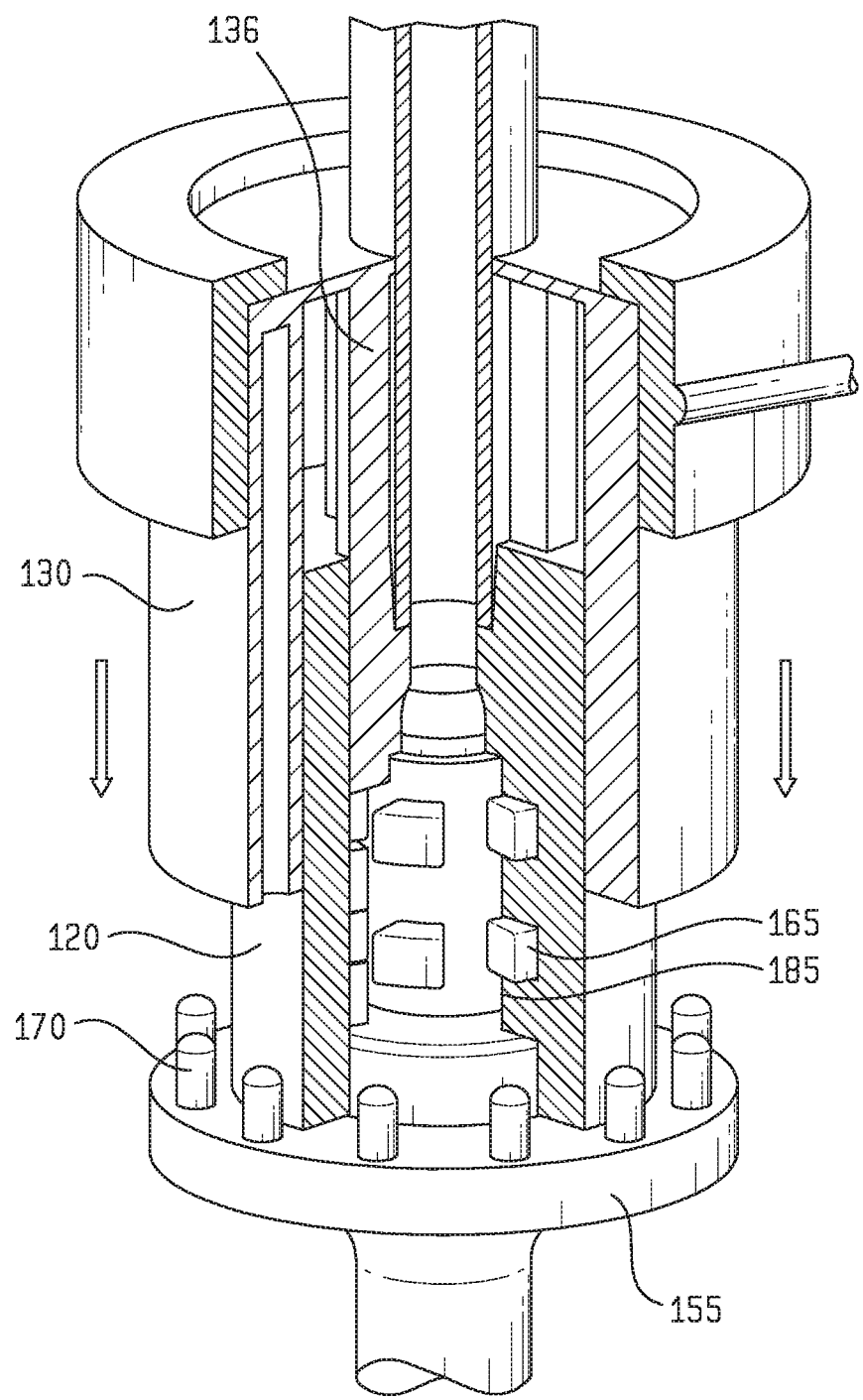
FIG. 8 illustrates another step of a multi-stop process for coupling the receiver assembly to the tool adapter of the tool coupler.
Figure 9:
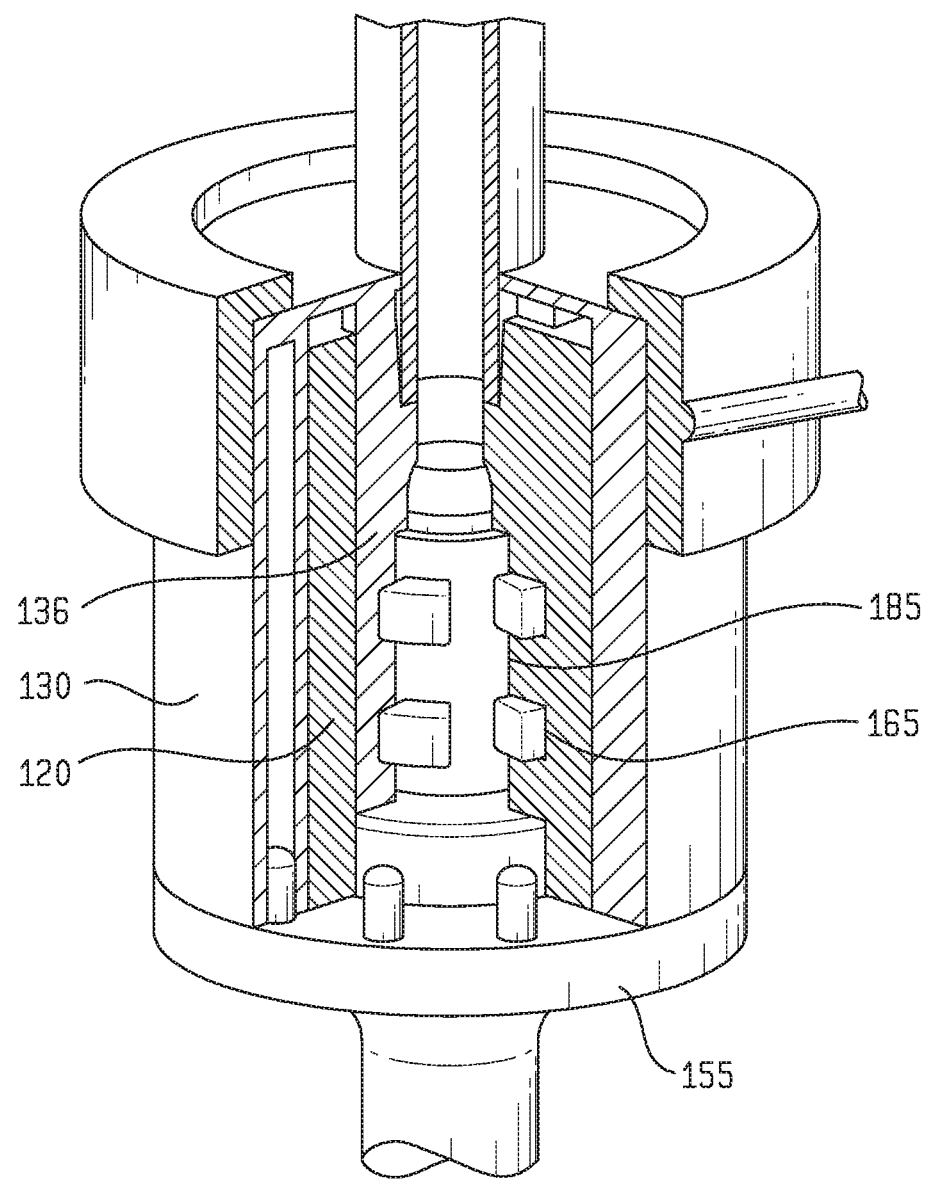
FIG. 9 illustrates another step of a multi-stop process for coupling the receiver assembly to the tool adapter of the tool coupler.
Figure 10:
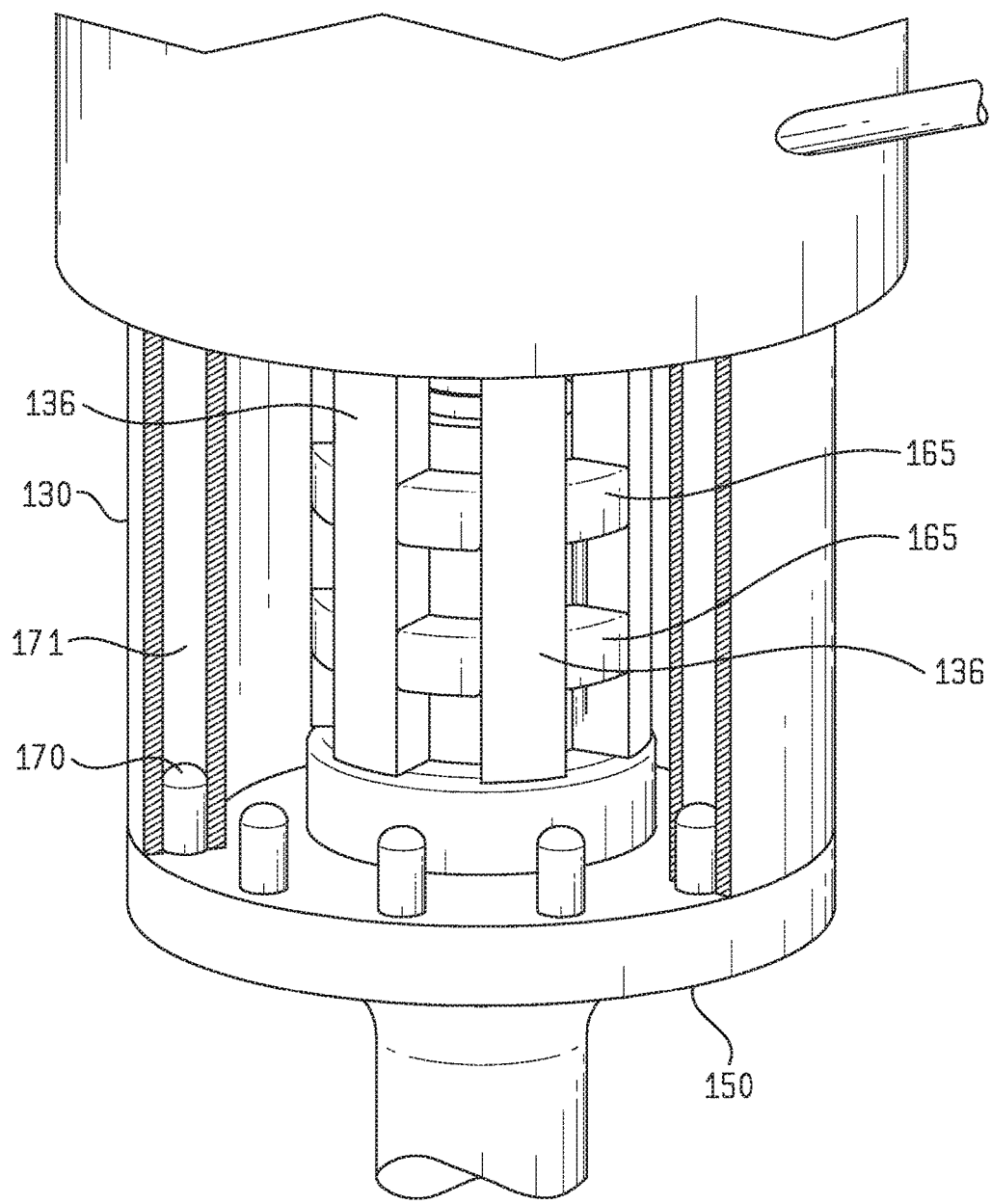
FIG. 10 illustrates another view of the tool coupler of FIG. 2 without showing the inner housing.

After stopping rotation of the shaft 160, the outer housing 130 is moved axially downward relative to the inner housing 120, as shown in FIG. 8. Downward movement of the outer housing 130 also moves the beams 136 downward in the grooves 153 between the locking members 165. FIG. 10 shows the outer housing 130 after moving downward and the inner housing 120 removed for clarity. It can be seen that the beams 136 are located between the locking members 165, and the bottom of the beams 136 on the shaft stand. In this position, the shaft 160 is locked from relative rotation with respect to the tool receiver 110. As a result, torque may be transferred between the top drive 4 and the tool.

In FIGS. 10 and 4, it can also be seen that the couplings 170 have been inserted into a respective channel 132 in the outer housing 130. This connection allows communication of power and/or data between the top drive and the tool. For example, the hydraulic fluid, pneumatic fluid, or electric power can be supplied from the top drive to the tool for operation.

In one embodiment, an actuator is used to move the outer housing 130 downward relative to the inner housing 120 and the shaft 160. In one example, the actuator is a piston and cylinder assembly 112, as shown in FIG. 2. The piston and cylinder assembly 112 is positioned proximate the lower end of the tool coupler 100 and couples the lower end of the inner housing 120 and the lower end of the outer housing 130. Actuation of the piston and cylinder assembly moves the outer housing 130 axially relative to the inner housing 120. In another example, the actuator is a piston and cylinder assembly that couples the swivel 168 to the top drive. In this example, actuation of the piston moves the swivel 168 and the outer housing 130 axially relative to the top drive 4, and therefore, the inner housing 120. In another example, the actuator is a piston and cylinder assembly that couples an upper end of the inner housing 120 to an upper end of the outer housing 130. In one example, the piston and cylinder assembly is at least partially disposed in the annular area between the inner beams 136 and the outer wall 132 of the outer housing 130.

In another embodiment, the shaft 160 of the tool adapter 150 is configured to sealingly engage the inner housing 120 of the tool receiver 110. For example, the upper portion of the shaft 160 includes a groove for retaining a sealing member such as an o-ring. The sealing member engages the inner housing 120 when the shaft 160 is inserted into engagement with the inner housing 120. In another example, the upper portion of the shaft 160 is configured to form a metal-to-metal seal with the inner housing 120.

In another embodiment, the outer housing 130 is coupled to the base 155 of the shaft 160 using castellations. For example, the lower end of the outer housing 130 has castellations that mate with complementary castellations on the base 155. When lowered, the castellations of the outer housing 130 engage the castellations of the base 155, thereby preventing relative rotation between the outer housing 130 and the base 155. In this embodiment, the inner beams 136 become optional due to the tool receiver 110.

It should be understood that the components of the tool coupler 100 described herein can be usefully implemented in reverse configurations. For example, the tool adapter 150 is connected to the top drive 4, and the tool receiver 110 is connected to the tool. In another example, the tool receiver includes the shaft and the outer housing, and the tool adapter includes the inner housing.

Optionally, a locking mechanism may be used to lock the tool adapter 150 to the tool receiver 110. The locking mechanism can remain locked while the tool coupler 100 conveys axial load, rotational load, or both. Decoupling may only occur when tool coupler 100 is not carrying load. In one example, the actuator 112 may be self-locking (e.g., electronic interlock or hydraulic interlock). Alternatively, a locking pin may be used.

It should be appreciated that, for tool coupler 100, a variety of configurations, sensors, actuators, and/or adapters types and/or configurations may be considered to accommodate manufacturing and operational conditions. Possible actuators include, for example, worm drives, hydraulic cylinders, compensation cylinders, etc. The actuators may be hydraulically, pneumatically, electrically, and/or manually controlled. In some embodiments, multiple control mechanism may be utilized to provide redundancy. One or more sensors may be used to monitor relative positions of the components of the top drive system. The sensors may be position sensors, rotation sensors, pressure sensors, optical sensors, magnetic sensors, etc. In some embodiments, stop surfaces may be used in conjunction with or in lieu of sensors to identify when components are appropriately positioned and/or oriented. Likewise, optical guides may be utilized to identify or confirm when components are appropriately positioned and/or oriented. In some embodiments, guide elements (e.g., pins and holes, chambers, etc.) may assist in aligning and/or orienting the components of tool coupler 100. Bearings and seals may be disposed between components to provide support, cushioning, rotational freedom, and/or fluid management.

In an embodiment, a tool coupler includes a first component having a shaft and a plurality of locking members; a second component having an inner housing for receiving the shaft and a plurality of complementary locking member; and an outer housing configured to rotationally lock the first component to the second component.

In one or more embodiments disclosed herein, the outer housing includes a locking beam configured to engage with the plurality of locking members to rotationally lock the first component.

In one or more embodiments disclosed herein, the outer housing is axially movable relative to the inner housing.

In one or more embodiments disclosed herein, the locking beam is at least partially inserted through the inner housing.

In one or more embodiments disclosed herein, the tool coupler includes an actuator for moving the outer housing axially relative to the inner housing.

In one or more embodiments disclosed herein, the tool coupler includes a swivel in communication with the outer housing.

In one or more embodiments disclosed herein, the outer housing includes a channel for communication with the swivel.

In one or more embodiments disclosed herein, the first component includes a coupling for transmitting at least one of power and data.

In one or more embodiments disclosed herein, the outer housing includes a channel for communication with the coupling.

In one or more embodiments disclosed herein, the channel is formed in an outer wall of the outer housing.

In one or more embodiments disclosed herein, the coupling is insertable into the channel.

In one or more embodiments disclosed herein, the shaft sealingly engages the inner housing.

In an embodiment, a method of coupling a first component to a second component includes inserting a central shaft of the first component into an inner housing of the second component; rotating the first component relative to the second component to cause a plurality of locking members of the first component to engage a plurality of complementary locking members of the second component; and axially moving an outer housing of the second component relative to the inner housing to rotationally lock the first component relative to the second component.

In one or more embodiments disclosed herein, axially moving the outer housing comprises axially moving a locking beam into engagement with the plurality of locking members of the first component.

In one or more embodiments disclosed herein, the locking beam is moved into a groove between the plurality of locking members.

In one or more embodiments disclosed herein, rotating the first component axially aligns the plurality of locking members of the first component with the plurality of complementary locking members of the second component, thereby axially locking the first component to the second component.

In one or more embodiments disclosed herein, the method includes placing a coupling of the first component into communication with a channel in the second component.

In one or more embodiments disclosed herein, axially moving the outer housing relative to the inner housing places the coupling into communication with the channel.

In one or more embodiments disclosed herein, the method includes communicating at least one of power and data between the channel and the coupling.

While the foregoing is directed to embodiments of the present disclosure, other and further embodiments of the disclosure may be devised without, departing from the basic scope thereof, and the scope thereof is determined by the claims that follow.

The invention claimed is:

1. A tool coupler comprising:
a first component having a shaft and a plurality of locking members;
a second component configured to connect to the first component, having:
an inner housing for receiving the shaft and a plurality of complementary locking member, wherein the shaft is rotatable relative to the inner housing; and
an outer housing configured to rotationally lock the first component to the second component.

2. The tool coupler of claim 1, wherein the outer housing includes a locking beam configured to engage with the plurality of locking members to rotationally lock the first component.

3. The tool coupler of claim 1, wherein the outer housing is axially movable relative to the inner housing.

4. The tool coupler of claim 3, wherein the outer housing includes a locking beam configured to engage with the plurality of locking members to rotationally lock the first component.

5. The tool coupler of claim 4, wherein the locking beam is at least partially inserted through the inner housing.

6. The tool coupler of claim 1, further comprising an actuator for moving the outer housing axially relative to the inner housing.

7. The tool coupler of claim 1, further comprising a swivel in communication with the outer housing.

8. The tool coupler of claim 7, wherein the outer housing includes a channel for communication with the swivel.

9. The tool coupler of claim 1, wherein the first component includes a coupling for transmitting at least one of power and data.

10. The tool coupler of claim 9, wherein the outer housing includes a channel for communication with the coupling.

11. The tool coupler of claim 10, wherein the channel is formed in an outer wall of the outer housing.

12. The tool coupler of claim 10, wherein the coupling is insertable into the channel.

13. The tool coupler of claim 1, wherein the shaft sealingly engages the inner housing.

14. A tool coupler comprising:
a first component having a plurality of locking members;
a second component having:
   an inner housing having a plurality of complementary locking members for configured to engage with the plurality of locking members; and
   an outer housing configured to rotationally lock the first component to the second component, wherein the outer housing is axially movable relative to the inner housing.

15. The tool coupler of claim 14, wherein the outer housing includes a locking beam configured to engage with the plurality of locking members to rotationally lock the first component.

16. The tool coupler of claim 15, wherein the locking beam is at least partially inserted through the inner housing.

17. The tool coupler of claim 14, wherein the first component includes a coupling for transmitting at least one of power and data.

18. The tool coupler of claim 17, wherein the outer housing includes a channel for communication with the coupling.

19. The tool coupler of claim 18, wherein the channel is formed in an outer wall of the outer housing.

20. The tool coupler of claim 18, wherein the coupling is insertable into the channel.

21. The tool coupler of claim 18, wherein the outer housing is axially moved relative to the inner housing to insert the coupling into the channel.

22. A tool coupler comprising:
a first component having a shaft and a plurality of locking members;
a second component configured to connect to the first component, having:
   an inner housing for receiving the shaft and a plurality of complementary locking member; and
   an outer housing configured to rotationally lock the first component to the second component, wherein the outer housing includes a locking beam configured to engage with the plurality of locking members to rotationally lock the first component.

* * * * *